MAGNETIC AMPLIFIER CIRCUITS

Filed Oct. 24, 1955 2 Sheets-Sheet 1

INVENTORS.
HOWARD WILLIAM COLLINS
ROLAND W. ROBERTS
WALLACE J. DUNNET

BY
Roland A. Anderson
Attorney

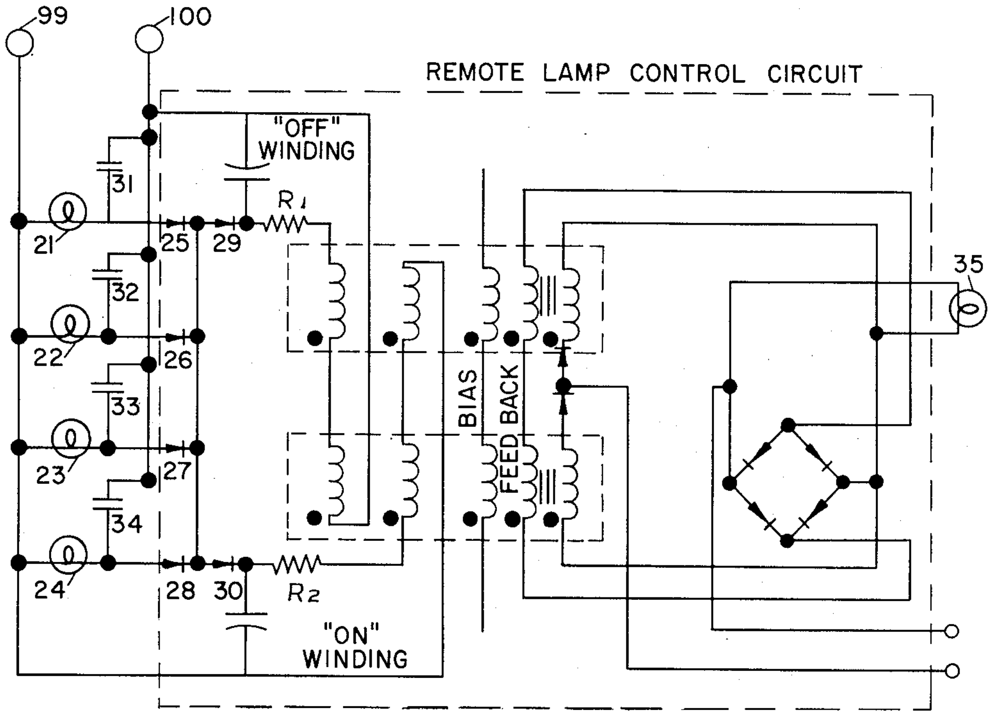
Fig. 3
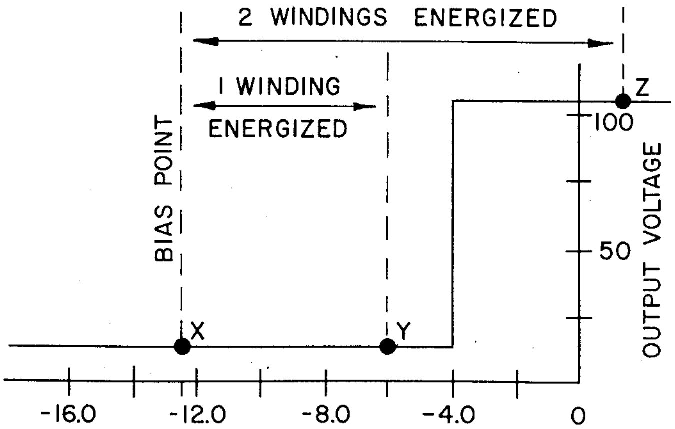
Fig. 4 CONTROL AMPERE TURNS
INVENTORS.
HOWARD WILLIAM COLLINS
ROLAND W. ROBERTS
WALLACE J. DUNNET
BY Roland A. Anderson
Attorney 2,807,006
Patented Sept. 17, 1957

2,807,006

MAGNETIC AMPLIFIER CIRCUITS

Howard William Collins and Roland W. Roberts, Pittsburgh, Pa., and Wallace J. Dunnet, Newtonville, Mass., assignors, by mesne assignments, to the United States of America as represented by the United States Atomic Energy Commission Application October 24, 1955, Serial No. 542,529

3 Claims. (Cl. 340—213)

The present invention relates to magnetic amplifiers developed to provide computer and power amplification functions in indicating and control systems.

It is an object of this invention to provide a system which employs any number of input signals operating from the same A.-C. power system and energize a device only when all input signals are present and de-energize the device only when all signals disappear.

It is another object of this invention to make the operation of the system independent of the order in which the input signals are received.

It is a further object of the invention to make the system operable with a minimum number of circuit components which components can also pass rigid military shock and vibration tests.

Initially, a system was proposed to accomplish these objectives which employed a number of relays. This system included individual relays, together with appropriate amplifiers, which would be energized by their associated input signals. The contacts operated by the relays were connected in series with each other and with a master relay so that the master relay would not be energized until the last individual relay was energized by its input signal. Once the master relay was energized it closed the circuit to the remote device which was to be operated according to the above objectives of this invention.

In order to achieve the further objective of this invention, namely that the circuit to the remote device would not be opened until the last of the individual relays was de-energized by their associated input signals, the master relay was kept energized by an interlocking relay. In order to keep the interlocking relay energized until the last individual relay was de-energized, a series of relays connected in parallel were provided so that as each aforesaid individual relay was de-energized it would de-energize one of the parallel connected relays. When the last of the parallel relays was de-energized it would break the circuit to the interlocking relay which would in turn de-energize the master relay. Thus the aforementioned objectives were achieved utilizing a number of relays together with an amplifier for each input signal.

Since some relays have a wide hysteresis type control characteristic (i. e. a large difference between pick-up and drop-out values), a possible simplification of this circuit could be made. Each of the individual relays, after being energized by its associated amplified input signal, could furnish one-sixth (assuming six input signals connected in parallel) of the pick-up current required by the master relay coil. The master relay would be designed to pick-up only when all six parallel circuits are closed and to drop out only when the last of the six individual relays are de-energized. Aside from the difficulties in procuring and maintaining adjustment of such a relay system, the discrimination between five and six is subject to line voltage variations, temperature changes, etc.

The present invention achieves a simplification of this system as well as eliminating difficulties from the line voltage variations, temperature changes, and general ruggedness.

This invention will be better understood from the following more detailed description disclosed in conjunction with the accompanying drawing. The description is of the application of this invention to an indication of the position of the control rods in an atomic reactor by means of indicating lamps.

Fig. 3 illustrates the detailed circuit diagram for the overall indicating system.

Fig. 4 illustrates a graph of a variation of the control of the remote control device.

Figure 1:
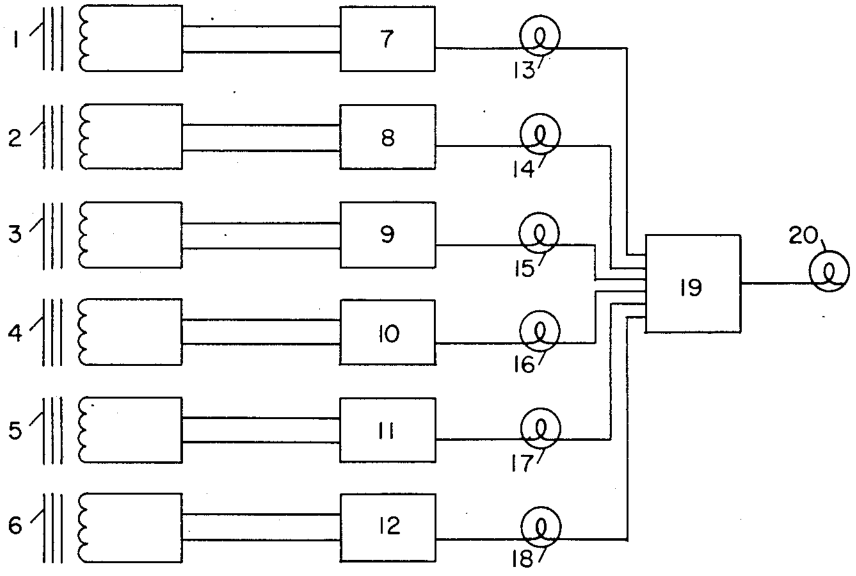
Fig. 1 represents a schematic diagram of the overall indicating system.

Referring to Fig. 1, the position of each individual control rod in the atomic reactor is sensed by the magnetic slugs 1—6 of the differential transformers. This is accomplished by means of a suitable mechanical linkage (not shown) between the control rods and their respective magnetic slugs 1—6. When the magnetic slugs reach a certain position the differential transformers develop a 1.5 A.-C. signal which must control nearby lamps 13—18 to indicate the position of each slug. This is accomplished by means of magnetic amplifiers which are local lamp control devices 7—12 of Fig. 1. These function as ultra-sensitive A.-C. relays to control the local lamps 13—18. In addition, the system requires that a remote lamp 20 indicate, in the following manner, the state of the group of local lamps. The remote lamp 20 must come on only when the last of the group of local lamps comes on. It must then stay on until the last of the local lamps goes off. The remote lamp must respond only when all of the local lamps are on or off, and its operation must be independent of the order in which the local lamps are controlled. The remote lamp control device 19 is a computer type magnetic amplifier used to control the remote lamp 20 in the required manner.

The functions outlined above can be performed by relay and vacuum tube circuits and such circuits were considered as stated previously. Since a magnetic amplifier is a completely static device, it is not subject to the mechanical weakness and variations which limit the reliability of relays. Control can be accomplished entirely by electrical means. The inherent ruggedness of magnetic amplifiers is particularly valued in this system as all units must pass rigid military shock and vibration tests. Furthermore, the long life of magnetic amplifiers produces reliability not possible with vacuum tube circuits.

In addition to greater ruggedness and reliability, the use of magnetic amplifiers allowed certain simplifications which are desirable in a complex control system. Since magnetic amplifiers operate directly from A.-C. supply, a separate D.-C. power supply is not required. Since no heater power is required, magnetic amplifiers have greater efficiency and require no warm-up time. As will be explained in the detailed description of the remote lamp amplifier, a single magnetic amplifier in association with the input circuitry can perform a control function which otherwise requires a great many relays. These features are of increased importance in a system where a multiplicity of identical amplifiers are required.

Figure 2:
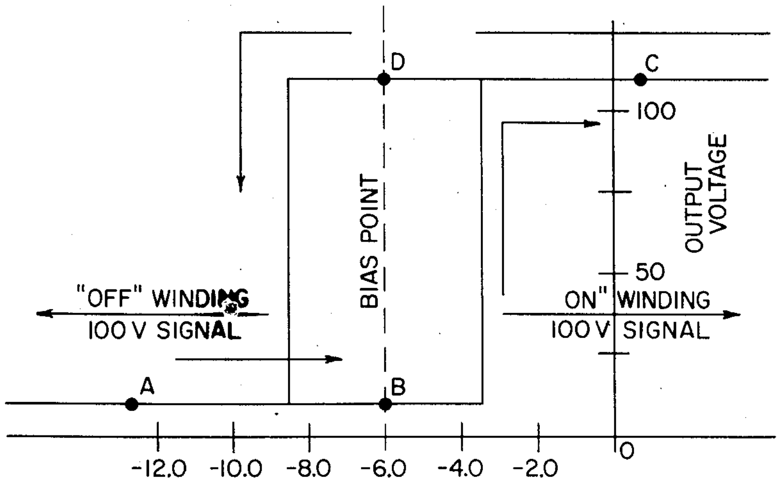
Fig. 2 illustrates the control characteristics of the remote lamp control device.

The remote lamp control device 19 of Fig. 1 is a bistable magnetic amplifier which has an extensive amount of positive feedback to produce the hysteresis type control characteristic shown in Fig. 2. This characteristic gives the device a "memory" and makes it possible to sense a cycle of events. An obvious means of using this type bistable amplifier to control the remote lamp is to use a separate control winding parallel with each individual lamp. As each local lamp is energized one-sixth of the control ampere turns necessary to trigger on the amplifier would be provided. After the remote lamp is lighted, because of the hysteresis characteristic, the remote lamp will remain "on" until the last local lamp is again turned "off." This system counts increments within the loop and is analogous to the aforementioned relay circuit. Slight variations in the size of the control increments or the size or shape of the control characteristics will cause incorrect operation. With a large number of input signals the operation of this system is precarious and of doubtful reliability.

To overcome the limitations of this system, a computer type rectifier network was designed to totalize the input signals and does not allow counting within the loop. Instead, the magnetic amplifier, which is remote lamp control device 19 of Fig. 1, is provided with a signal of one polarity when all of the input signals are received and of another polarity when all are absent. The amplifier is biased in the center or loop and has one control winding connected to drive it in an "on" direction and another winding connected to drive it in an "off" direction. Regardless of the number of inputs, this system has only three operating points as shown in Fig. 2.

Much greater stability results and only two control windings are needed by the amplifier. The response time of a bi-stable magnetic amplifier is, to a great degree, a function of how much the control is driven beyond the trigger point. Since this system uses only two large control increments rather than many small ones, the amplification control can be greatly over-driven and the amplifier consequently made much faster.

The remote control circuit, using the rectifier computer network in conjunction with a wide-loop bi-stable amplifier is shown in Fig. 3. Only four input channels (21—24) are shown but it can be seen in the following explanation that the operation is the same with an increased number of inputs. It is only necessary to add one miniature rectifier, such as 25—28, for each additional input channel. As mentioned previously, the local lamp control devices (conventional magnetic amplifiers) function as ultra-sensitive relays. In Fig. 3 these control devices can therefore be replaced, for simplicity of explanation, by relay contacts 31—34 which simulate their "off-on" characteristics.

When all contacts 31—34 are open the local lamps are all "off." The "on" winding is not energized since both ends of it are connected to the same side of the line 99. On one half of the cycle there is a current path through the lamp filaments 21—24, through the input rectifiers 25—28 and rectifier 29, and through R1 to the other side of line 100. The resistor R1 is large relative to the lamp resistor (about ten times greater) so that the current which flows is much too small to light the lamps 21—24, but with proper filtering it is sufficient to energize the "off" winding. Since the "off" winding is energized and the "on" winding is de-energized, the amplifier is operating at point A on the operating loop of Fig. 2 and the remote lamp 35 of Fig. 3 is "off."

If one contact 31 is now closed, the corresponding local lamp 21 lights. On one-half cycle there is now a path through the contact 31, through the input rectifier 25, and through the resistor R2 which, with proper filtering, energizes the "on" winding. On the other half cycle the "off" winding remains energized. Since both control windings are energized and of equal magnitude and driving in opposite directions, their effects cancel each other and the amplifier operating point is determined by the bias of point B of Fig. 2. If any intermediate number of contacts 31—34 of Fig. 3 are closed, the current paths through both "on" and "off" windings remain and the operating points do not move from point B of Fig. 2. Note that as a contact of Fig. 3 is closed, the potential it placed across the "off" winding is no longer present since both sides of the winding are tied to the same side of line 100. Because of the blocking action of the input rectifier 29, potential is maintained across the winding by the remaining open contacts.

When the last of the contacts 31—34 is closed, the "off" winding is in all cases tied to the same side of line 100 and is no longer energized. Since only the "on" winding is now energized, the operating point shifts to point C on the loop of Fig. 2 and the remote lamp 35 of Fig. 3 lights.

As contacts 31—34 of Fig. 3 are opened, the intermediate state with both "on" and "off" control windings energized again occurs and the operating point shifts to point D of Fig. 2. Because of the hysteresis loop of the bi-stable amplifier, the remote lamp 35 of Fig. 3 remains "on" until the last contact is opened. The amplifier then returns to point A of Fig. 2 and is ready to again begin the cycle.

The circuits which have been designed operate from 117 volts, 60 c. p. s. supply, as indicated between the contacts 99 and 100 of Fig. 3. The amplifier circuits will operate correctly with wide variations of supply voltage, since the feed back, bias, and control signals increase proportionally with the voltage. The proportions of the control characteristics of Fig. 2 therefore remain essentially constant as do those amplifiers which control the local lamps 13—18 of Fig. 1. The remote local lamp amplifier 19 of Fig. 1 operates correctly with a supply voltage between 60 and 130 volts, and the local lamp amplifiers 7—12 operate correctly between 90–130 volts.

Various modes of operation of the remote lamp amplifier 19 of Fig. 1 can be obtained by making slight variations in the circuitry. For example, it is possible to indicate when an intermediate number of a group of machines of a manufacturing process is in operation. To accomplish this scheme of operation, it is necessary to decrease the control characteristic loop to a minimum, reverse the "on" winding, and shift the bias as shown in Fig. 4. When an intermediate number of devices are "on," both control windings are energized, as explained previously, and sufficient control is present to drive the amplifier to point Z of Fig. 4. When the devices are either all "on" or all "off," only one winding is energized, and the amplifier is driven to the trigger point Y of Fig. 4. Therefore, the group device remains "off."

The remote lamp amplifier 19 illustrates several features of magnetic amplification circuitry which make it easily adaptable to perform computer functions. Signals can be easily adjusted and protected by magnetic mixing in the control windings, yet kept electrically isolated. Magnetic amplifiers can be easily used in conjunction with computer type rectifier networks, such as "and/or" circuits, which selectively respond to a multiplicity of signals. By varying the amount of feedback, a linear, bi-stable, or hysteresis type bi-stable control characteristic can be obtained, and various amplifier functions can thereby be achieved. By utilizing these features the magnetic amplifiers can perform functions which require the interpretation and sorting of signals as well as those requiring power amplification.

We claim as our invention:

1. A magnetic amplifier system for indicating the position of control rods in an atomic reactor comprising a computer type remote magnetic amplifier having a saturable magnetic core; a controlled winding on said magnetic core for connection to a remote indicating lamp; a positive voltage feedback circuit from said controlled winding to said magnetic core to produce a hysteresis type control characteristic; a bias control winding on said magnetic core which biases said remote amplifier at the center of said hysteresis loop; two control windings on said magnetic core wound in opposite directions; an input circuit for energizing said control windings connected to an alternating current power supply comprising a parallel group of indicating lamps each having an input rectifier connected in series therewith; one of said control windings connected in parallel with said group of indicating lamps and said alternating power supply and the other of said control windings being connected in series with said parallel group of indicating lamps and one side of the alternating current power supply; each of said control windings having a capacitor in parallel therewith and a resistor serially connected therewith; said resistors having at least ten times the resistance of said indicating lamps; a magnetic amplifier connected to each of said indicating lamps; a differential transformer, having a magnetic core therein which senses the position of a control rod of an atomic reactor, connected to each of said magnetic amplifiers to energize same, said input circuit operating in a manner to cause the remote indicating lamp to light when all of said magnetic cores have caused said transformers to light all of said indicating lamps by means of said magnetic amplifiers and to cause the remote indicating lamp to remain energized until all of said indicating lamps are no longer energized.

2. A magnetic amplifier for indicating and control functions comprising a computer type magnetic amplifier having a saturable magnetic core; two control windings on said core wound in opposite directions; an input circuit for energizing said control windings; a controlled winding on said saturable magnetic core connected to a remote indicating device; a positive voltage feedback circuit from said controlled winding to said saturable magnetic core to produce a hysteresis type control characteristic; the improvement in said magnetic amplifier consisting of a bias control winding on said saturable magnetic core which biases said amplifier in the center of said hysteresis loop.

3. A magnetic amplifier system for indicating and control functions comprising a computer type remote magnetic amplifier having a saturable magnetic core; a controlled winding on said magnetic core for connection to a remote indicating lamp; a positive voltage feedback circuit from said controlled winding to said magnetic core to produce a hysteresis type control characteristic; a bias control winding on said magnetic core which biases said remote amplifier at the center of said hysteresis loop; two control windings on said magnetic core wound in opposite directions; an input circuit for energizing said control windings comprising a group of indicating lamps connected in parallel to an alternating current power supply; an input rectifier connected in series with each lamp and each control winding for rectifying said alternating current power supply; and a switching means for energizing each indicating lamp.

References Cited in the file of this patent

UNITED STATES PATENTS

| | | |
|---|---|---|
| 2,697,825 | Lord | Dec. 21, 1954 |
| 2,700,759 | Ogle et al. | Jan. 25, 1955 |
| 2,745,090 | Grillo | May 8, 1956 |